United States Patent
Kumar Patra et al.

(10) Patent No.: US 11,595,865 B2
(45) Date of Patent: Feb. 28, 2023

(54) ENFORCING UNIQUE HANDOVER TRIGGER THRESHOLDS FOR USER EQUIPMENT

(71) Applicant: Cisco Technology, Inc., San Jose, CA (US)

(72) Inventors: Chinari Santosh Kumar Patra, Dublin, CA (US); Srinath Gundavelli, San Jose, CA (US); Rakesh Sai Srirambhatla, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/225,426

(22) Filed: Apr. 8, 2021

(65) Prior Publication Data
US 2022/0330112 A1 Oct. 13, 2022

(51) Int. Cl.
*H04W 12/06* (2021.01)
*H04W 36/00* (2009.01)
(Continued)

(52) U.S. Cl.
CPC ..... *H04W 36/00837* (2018.08); *H04W 12/06* (2013.01); *H04W 36/0009* (2018.08); *H04W 76/11* (2018.02); *H04L 2101/654* (2022.05)

(58) Field of Classification Search
CPC ............. H04W 12/06; H04W 36/0009; H04W 36/00837; H04W 76/11; H04L 2101/654
See application file for complete search history.

(56) References Cited

U.S. PATENT DOCUMENTS

| | | | |
|---|---|---|---|
| 8,199,720 B2* | 6/2012 | Hahn | H04L 63/08 |
| | | | 455/436 |
| 9,020,467 B2* | 4/2015 | Zhang | H04L 63/0853 |
| | | | 370/332 |

(Continued)

FOREIGN PATENT DOCUMENTS

WO    2018202797 A1    11/2018

OTHER PUBLICATIONS

3GPP, "3rd Generation Partnership Project; Technical Specification Group Radio Access Network; NR; Radio Resource Control (RRC) protocol specification (Release 16)", 3GPP TS 38.331 V16.3.1 (Jan. 2021), 932 pages.

(Continued)

*Primary Examiner* — Jean A Gelin
(74) *Attorney, Agent, or Firm* — Edell, Shapiro & Finnan, LLC

(57) ABSTRACT

Presented herein are techniques to facilitate enforcing unique handover trigger thresholds for user equipment (UE) based on UE identity and/or UE group type. In one instance, a method is provided that may include provisioning a plurality of handover profiles for a plurality of user equipment for a mobile network in which each corresponding handover profile includes a profile identifier and one or more handover thresholds. The method may further include determining that a particular user equipment seeks a connection to the mobile network; identifying a particular handover profile for the particular user equipment, wherein the particular handover profile includes a particular profile identifier; providing the particular profile identifier to a radio access network node of the mobile network; identifying one or more particular handover thresholds for the particular user equipment based on the particular profile identifier; and (Continued)

providing one or more particular handover thresholds to the particular user equipment.

20 Claims, 6 Drawing Sheets

(51) Int. Cl.
    *H04W 76/11*            (2018.01)
    *H04L 101/654*        (2022.01)

(56) References Cited

U.S. PATENT DOCUMENTS

| | | | |
|---|---|---|---|
| 9,629,033 B2 | 4/2017 | Kulal | |
| 10,827,347 B1* | 11/2020 | Donkers | H04W 12/02 |
| 2007/0142031 A1* | 6/2007 | Lee | H04M 15/8027 |
| | | | 455/433 |
| 2007/0249352 A1* | 10/2007 | Song | H04L 63/08 |
| | | | 455/436 |
| 2008/0198809 A1* | 8/2008 | Kim | H04W 12/06 |
| | | | 370/331 |
| 2009/0207812 A1* | 8/2009 | Gupta | H04W 36/0094 |
| | | | 370/332 |
| 2009/0270105 A1* | 10/2009 | Kakumaru | H04W 36/36 |
| | | | 455/436 |
| 2014/0004815 A1* | 1/2014 | Shaw | H04M 15/853 |
| | | | 455/405 |
| 2014/0066069 A1* | 3/2014 | Salami | H04W 36/30 |
| | | | 455/436 |
| 2015/0049610 A1 | 2/2015 | Kim et al. | |
| 2015/0050955 A1 | 2/2015 | Kim et al. | |
| 2015/0181481 A1 | 6/2015 | Masini et al. | |
| 2015/0327127 A1 | 11/2015 | Centonza et al. | |
| 2015/0341851 A1 | 11/2015 | Cai et al. | |
| 2016/0029279 A1* | 1/2016 | Bellamkonda | H04W 36/0079 |
| | | | 455/436 |
| 2016/0173358 A1* | 6/2016 | Yiu | H04W 36/00837 |
| | | | 455/423 |
| 2017/0303180 A1 | 10/2017 | Kapoulas et al. | |
| 2017/0347298 A1* | 11/2017 | Brown | H04W 36/00835 |
| 2018/0115932 A1 | 4/2018 | Gomes et al. | |
| 2019/0166016 A1 | 5/2019 | Livanos et al. | |
| 2019/0342734 A1 | 11/2019 | Palanisamy et al. | |
| 2020/0154350 A1 | 5/2020 | Dao et al. | |
| 2020/0367297 A1 | 11/2020 | Dao et al. | |
| 2021/0045032 A1* | 2/2021 | Choi | H04W 12/06 |
| 2021/0092650 A1* | 3/2021 | Ramamurthi | H04W 24/10 |
| 2021/0410022 A1* | 12/2021 | Rahat | H04W 36/0022 |

OTHER PUBLICATIONS

3GPP, "3rd Generation Partnership Project; Technical Specification Group Radio Access Network; NR; Medium Access Control (MAC) protocol specification (Release 16)", 3GPP TS 38.321 V16.3.0 (Dec. 2020), 156 pages.

Techplayon, "5G NR Radio Network Temporary Identifier (RNTI)", Nov. 5, 2018, 6 pages.

Techplayon, "5G NR Measurement Events", Feb. 26, 2020, 13 pages.

ETSI, "5G; NG-RAN; NG Application Protocol (NGAP) (3GPP TS 38.413 version 15.0.0 Release 15)", ETSI TS 138 413 V15.0.0 (Jul. 2018), 256 pages.

ShareTechnote, "LTE Quick Reference", retrieved from Internet Dec. 22, 2020, 7 pages.

Apple Support, "macOS wireless roaming for enterprise customers", retrieved from Internet Mar. 9, 2021, 5 pages.

\* cited by examiner

ENFORCING UNIQUE HANDOVER TRIGGER THRESHOLDS FOR USER EQUIPMENT

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases, efficient management of user equipment connections with mobile network resources becomes more critical. In particular, there are significant challenges in managing user equipment handovers in a mobile network environment.

DESCRIPTION OF EXAMPLE EMBODIMENTS

Overview

Figure 1:
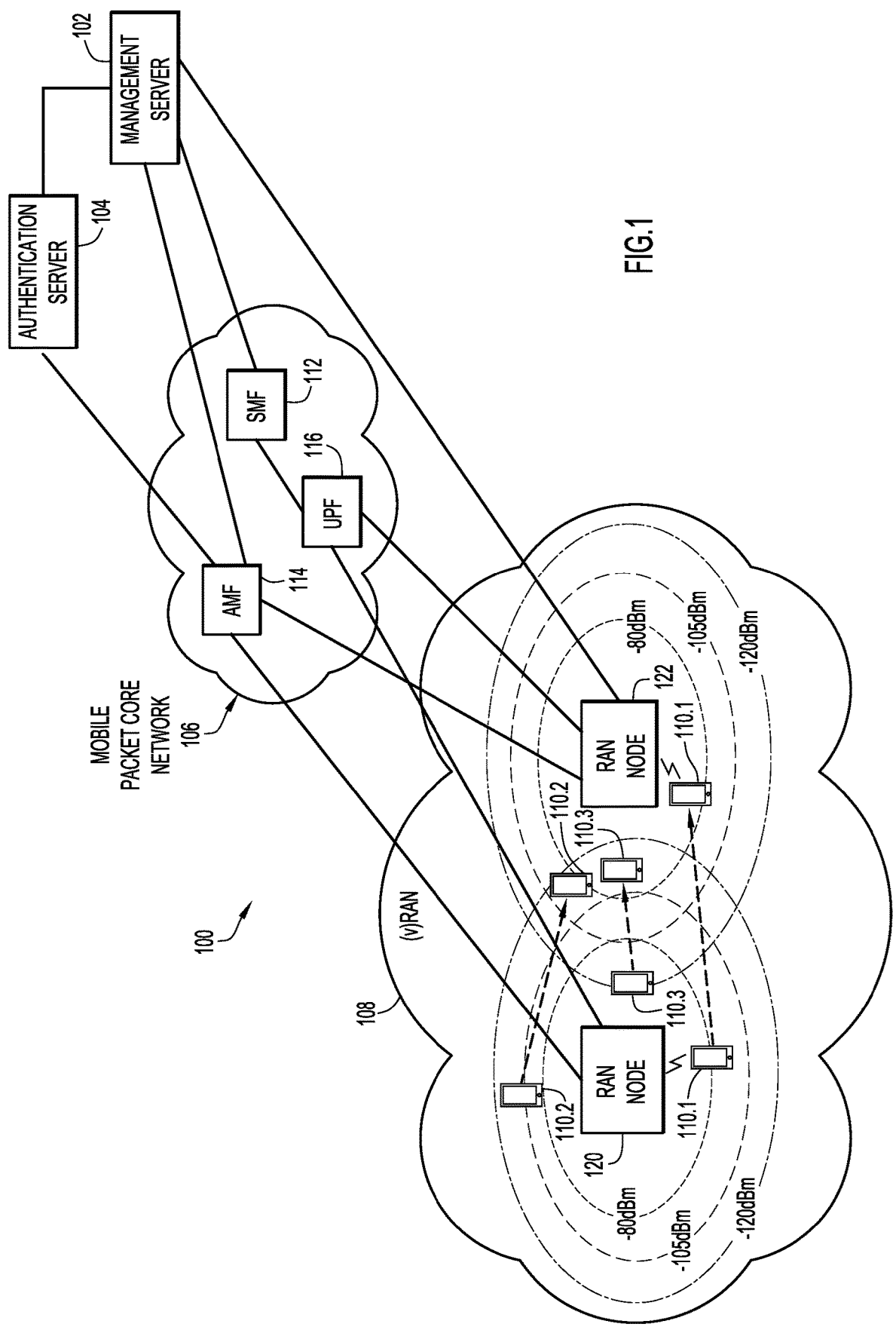
FIG. 1 is a simplified block diagram of a system in which techniques may be implemented to enforce unique handover trigger thresholds for user equipment (UE), according to an example embodiment.

Techniques herein provide for enforcing unique handover trigger thresholds for user equipment (UE) based on UE identity/UE group type. During operation, an enterprise management server can be configured with a set of handover profiles in which each handover profile can be customized for a specific device type and/or application(s) that share a common set of characteristics (e.g., a common set of application characteristics, a common set of operating characteristics, etc.). The handover profiles can be provided to radio access network (RAN) nodes of an enterprise RAN. Further, each of a corresponding UE identity for enterprise UEs can be configured within an enterprise authentication server in which each UE identity can be associated with a corresponding handover profile identified via a handover profile identifier. As part of the attach procedures for a UE to a radio access network (RAN) associated with the enterprise RAN, the authentication server can provide the handover profile identifier to the enterprise RAN via a mobile packet core network (e.g., a 5G packet core), thereby allowing the network to apply UE-specific/UE-group specific handover behaviors for the given UE.

In one instance, a method is provided that may include provisioning a plurality of handover profiles for a plurality of user equipment for a mobile network in which each corresponding handover profile includes a profile identifier and one or more handover thresholds. The method may further include determining that a particular user equipment seeks a connection to the mobile network; identifying a particular handover profile for the particular user equipment, wherein the particular handover profile includes a particular profile identifier; providing the particular profile identifier to a radio access network node of the mobile network; identifying one or more particular handover thresholds for the particular user equipment based on the particular profile identifier; and providing one or more particular handover thresholds to the particular user equipment.

Example Embodiments

As referred to herein, a wireless wide area (WWA) access network, such as a cellular/Third (3rd) Generation Partnership Project (3GPP) access network, may be characterized as a Radio Access Network (RAN) having radio nodes, also sometimes referred to as RAN nodes, such as evolved Node Bs (eNBs or eNodeBs) for Fourth (4th) Generation (4G)/ Long Term Evolution (LTE) access networks, next generation Node Bs (gNBs or gNodeBs) for Fifth (5th) Generation (5G) and/or next Generation (nG or NG) access networks, and/or the like that provide a larger RAN coverage area as compared to the RAN coverages area typically provided by wireless local area (WLA) radio nodes (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node is typically larger (sometimes orders of magnitude larger) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/ environment.

In some instances, a RAN architecture can be implemented as a disaggregated virtualized RAN (vRAN) architecture that includes a functional disaggregation of a base station, such as a gNB, into various elements, including, but not limited to, a Central (or Centralized) Unit (CU), one or several Distributed Units (DUs), and one or several Radio Units (RUs). Further disaggregation may include separation of the CU into a Central Unit Control Plane (CU-CP) component and a Central Unit User Plane (CU-UP) component. In some instances, certain vRAN components may also be referred to as virtualized components (e.g., virtualized DU (vDU) components, and/or virtualized CU (vCU) components). For a vRAN architecture, one or more RU(s) can interface with a DU component, which further interfaces with a CU-CP component and a CU-UP component In some instances, enterprise entities (e.g., business entities, government entities, educational entities, etc.) may seek to integrate private WWA accesses, such as 3GPP 4G/LTE, 5G, nG, etc. into enterprise networks in combination with and/or in lieu of enterprise wired and/or WLA accesses.

By 'private' it is meant that a private WWA access network may provide network connectivity/services to clients (e.g., users/user equipment/devices/etc.) served by a network operator and/or service provider of the private WWA access network, such as an enterprise, an access network provider, etc. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers (e.g., AT&T®, etc.), enterprises network operators/service providers (e.g., Cisco®, etc.), and/or third party network operators/service providers (e.g., neutral host network operators/service providers, cloud service providers, etc.). A private network may also be referred to as a standalone non-public network (SNPN) in some instances. Cisco is a registered trademark of Cisco Technology, Inc. AT&T is a registered trademark of AT&T Intellectual Property.

Referring to FIG. 1, FIG. 1 is a block diagram of a system 100 in which techniques may be implemented to enforce unique handover trigger thresholds for user equipment (UE), according to an example embodiment. In at least one embodiment, the system 100 may represent an enterprise private mobile network associated with an enterprise entity (e.g., a business entity, a government entity, an educational entity, etc.) and may include a management server 102, an authentication server 104, a mobile packet core network 106, and a virtualized and/or non-virtualized Radio Access Network 108 (referred to herein as a (v)RAN 108 that may include any combination of virtualized and/or non-virtualized RAN nodes). Also shown in FIG. 1 are a number of user equipment (UE) 110 including a first UE 110.1, a second UE 110.2, and a third UE 110.3.

The mobile packet core network 106 may support functionality for any type and/or variation of a Third Generation Partnership Project (3GPP) Fifth Generation (5G) mobile network (e.g., a 5G core network (5GC)) and/or next Generation (nG) mobile network (e.g., a Sixth Generation (6G) core network) and/or Citizens Broadband Radio Service (CBRS) access network and, in at least one embodiment, may include at least one Session Management Function (SMF) 112, at least one Access and Mobility Management Function (AMF) 114, and at least one User Plane Function (UPF) 116. The (v)RAN 108 may include a first RAN node 120 and a second RAN node 122. In one instance, mobile packet core network 106 and (v)RAN 108 may represent an enterprise private (v)RAN/mobile packet core network or other SNPN.

Generally, a UE, such as UE 110.1, 110.2, and 110.3, may interface with one or more RAN node(s), such as first RAN node 120 and/or second RAN node 122, via one or more over-the-air Radio Frequency (RF) connections. Each RAN node 120, 122 may further interface with UPF 116 (e.g., via respective 3GPP N3 interfaces) and AMF 114 (e.g., via respective 3GPP N2 interfaces). The AMF 114 may further interface with the SMF 112 (e.g., via a 3GPP N11 interface). The AMF 114 may further interface with authentication server 104 and management server 102. The SMF 112 may also interface UPF 116 (e.g., via a 3GPP N4 interface) with management server 102. The management server 102 may further interface with each RAN node 120 and 122 of (v)RAN 108 (note, only an interface between management server and RAN node 122 is shown in FIG. 1, for purposes of brevity only).

The authentication server 104 and management server 102 may also interface with each other and may support any communication and/or other signaling protocols (e.g., 3GPP protocols, Internet Engineering Task Force (IETF) protocols, Open RAN (O-RAN) protocols, authentication/authorization protocols, etc.) to facilitate communications with each other and/or various elements of system 100.

It is to be understood that the mobile packet core network 106 for the system 100 of FIG. 1 may include other elements such as a Policy Control Function (PCF), a Unified Data Management (UDM) entity, a Unified Data Repository (UDR) entity, a Network Repository Function (NRF), a Network Slice Selection Function (NSSF), etc., as may be prescribed by 3GPP standards. These elements are not illustrated for FIG. 1 for purposes of brevity only in order to illustrate other features associated with system 100. Further, although not illustrated in FIG. 1, UPF 116 may further interface with one or more data network(s), such as any combination of Internet, an Internet Protocol (IP) Multimedia Subsystem (IMS), Ethernet network, Ethernet switching system(s), and/or the like with which a UE may seek connection for one or more UE session(s).

In at least one embodiment, the (v)RAN 108 may be implemented as a 5G Access Network (5G-AN). A RAN node, such as RAN node 120 and/or RAN node 122 of FIG. 1, may terminate any combination of a WWA (e.g., cellular) and/or WLA (e.g., Wi-Fi®) air interface for any combination of Radio Access Technology (RAT) types (sometimes referred to more generally as 'accesses') for (v)RAN 108 such as, but not limited to: 3GPP licensed spectrum accesses (e.g., 3rd Generation (3G), 4G/LTE, 5G, and/or next Generation (nG) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; CBRS accesses; combinations thereof; and/or the like.

In some instances, a RAN node can be implemented through a disaggregated vRAN architecture including disaggregated nodes or components, such as an RU, a DU, and a CU (including a CU-UP and a CU-CP, in some instances). Generally, an RU may perform lower Physical (PHY) layer and RF operations to facilitate RF connections with one or more UE. A DU (also sometimes referred to as a baseband unit) may provide lower level operations of the radio signal processing stack, such as Radio Link Control (RLC), Medium Access Control (MAC), and higher PHY layer operations, such as digital processing, including signal modulation, encoding, and scheduling, among others. A CU-UP may provide upper level operations of a radio signal processing stack, such as user plane Packet Data Convergence Protocol (PDCP) functions and user plane Service Data Adaptation Protocol (SDAP) functions, among others. The split of operations of a radio signal processing stack among between a DU a CU-UP can be varied depending on implementation and/or configuration of a given (v)RAN architecture. A CU-CP generally operates to control DU(s)

and the CU-UP for a (v)RAN architecture via Radio Resource Control (RRC) functions and the control plane part of the PDCP protocol.

Thus, a RAN node, such as RAN nodes 120, 122 of FIG. 1, may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more UE, such as the UE 110.1, UE 110.2, and UE 110.3 shown in FIG. 1, may connect to the RAN node for one or more sessions (e.g., voice, video, data, gaming, combinations thereof, etc.).

The coverage area of a radio or RAN node such as an eNB, gNB, RU, NG-RAN node, etc. is typically referred to as a 'cell' in which one or more UE may attach to the radio node that serves the coverage area/cell. In one instance, the coverage area of a RAN node may be represented according to transmit signal strength such that the transmit signal strength may decrease with increased distance from the location of the RAN node transmitter.

For example, as shown in FIG. 1, different signal strengths or power levels are illustrated for each RAN node 120 and 122 such that a first signal strength for the coverage area of each RAN node 120 and 122 within a first distance from each RAN node may be up to −80 decibel-milliwatts (dBm), a second signal strength between the first distance and a second distance from each RAN node 120 and 122 may be between −80 dBm and −105 dBm, and a third signal strength between the second distance and a third distance from each RAN node 120 and 122 may be between −105 dBm and −120 dBm in which the third distance represents a cell of for each RAN node. It is to be understood that the coverage area signal strengths as well as the coverage area shapes (e.g., concentric circles) shown in FIG. 1 are provided for illustrative purposes only in order to discuss various features associated with system 100 and are not meant to limit the broad scope of embodiments discussed herein. Other signal strengths and/or coverage area shapes may be facilitated by RAN nodes in accordance with embodiments herein.

A UE, such as any of UE 110.1, UE 110.2, and UE 110.3 shown in FIG. 1, may be associated with any user, subscriber, employee, client, customer, electronic device, etc. wishing to initiate a flow in system 100 of FIG. 1 and may be inclusive of any device that initiates a communication in the system, such as a computer, an electronic device such as an industrial device, automation device, enterprise device, appliance, Internet of Things (IoT) device, etc., a laptop or electronic notebook, a WWA/WLA (cellular/Wi-Fi®) enabled telephone/smart phone, tablet, etc. and/or any other device, component, element, or object capable of initiating voice, audio, video, media, or data exchanges within the system. It is to be understood that UEs discussed herein may also be configured with any combination of hardware (e.g., communications units, receiver(s), transmitter(s), transceiver(s), antenna(s) and/or antenna array(s), processor(s), memory element(s), baseband processor(s) (modems), etc.), controllers, software, logic, and/or any other elements/entities that may facilitate over-the-air RF connections with one or more access networks, such as with one or more of RAN nodes 120, 122 of (v)RAN 108.

Management server 102 may be inclusive of a network management platform that may facilitate management and/or control of functionality, network functions, etc. for mobile packet core network 106 an (v)RAN 108. In at least one embodiment, management server 102 may be inclusive of an Enterprise Management Platform and may be implemented as a Cisco® Digital Network Architecture Center (DNA-C) and/or a Cisco® RAN Element Management System (RAN-EMS).

In various embodiments, authentication server 104 may be implemented as any combination of an Authentication, Authorization, and Accounting (AAA) server (including a 3GPP AAA and/or non-3GPP AAA), an Authentication Server Function (AUSF), a Home Subscriber Server (HSS), and/or the like and may facilitate interfaces/communications via any combination of authentication/authorization protocols such as Remote Authentication Dial-In User Service (RADIUS), DIAMETER, Extensible Authentication Protocol (EAP) [including any EAP variations], combinations thereof, and/or the like. Generally, authentication server 104 may represent an enterprise policy system that provides authentication services for authenticating/authorizing one or more UE, such as UE 110.1, UE 110.2, and UE 110.3; to connect to one or more RAN node(s) 120, 122 of (v)RAN 108 and the mobile network provided via system 100.

In addition to various operations discussed for techniques herein, an AMF, such as AMF 114, may facilitate access and mobility management control/services for one or more UE, such as UE 110.1, UE 110.2, and UE 110.3, to facilitate one or more over-the-air RF connection(s) between the UE and the (v)RAN provided via the RAN nodes 120, 122. In addition to various operations discussed for techniques herein, an SMF, such as SMF 112 may be responsible for UE Protocol Data Unit (PDU) session management (SM), with individual functions/services being supported on a per-session basis in order to facilitate data transfer(s) between a UE and one or more data network(s). Generally, a UPF, such as UPF 116, may operate as a Virtual or Virtualized Network Function (VNF) to provide packet routing and forwarding operations for user data traffic and may also perform a variety of functions such as packet inspection, traffic optimization, Quality of Service (QoS), billing, policy enforcement and user data traffic, and billing operations (e.g., accounting, etc.) for UE sessions.

Generally, when a UE is mobile (moves) among different locations of a RAN, the UE will perform handover operations from a source cell to a target cell, based on the signal strength of cells measured by the UE. Handover support for a UE in a 3GPP 5G network can be based on either Xn-based or N2-based handover (HO) procedures. The purpose of these handover techniques is to ensure that an RF connection for a UE is maintained as the UE moves between the source and the target cells.

In current 3GPP standards based deployments, the handover procedure for a UE is triggered when there is change in the radio conditions, e.g. for instances in which the UE measures is better signal from a neighbor cell than the current cell to which the UE is currently attached. Based on the UE reported measurement reports, the network makes the handover determination. The trigger threshold for handover is a parameter that is configured on the network and is enforced by the network. For current 3GPP standards-based deployments, the HO trigger threshold value is the same for all the UE's attached to the cell and the network enforces the same HO threshold value for all the UE's. This approach makes sense for public cellular network with a large UE volume in which many of the devices are of the same type (e.g., mobile phones).

In contrast, enterprise private 5G network are often deployed in different environments than public cellular networks. For example, enterprise private 5G networks can involve factory floors with robots, automated guided vehicles (AGVs), torque controls, Push2Talk devices, Internet of Things (IoT) sensors, and many other devices with varied application requirements. Often, there are devices in enterprise private 5G networks that utilize applications that may be sensitive to latency but do not involve high throughput, and, conversely, there are applications that may involve minimum data throughput but cannot afford packet loss. Therefore, the devices on a factory floor and in other enterprise environments can have different characteristics and different service requirements, such that applying a uniform code or handover threshold for handovers across all the devices does not make sense and is not efficient.

In accordance with techniques discussed herein, the system 100 of FIG. 1 may overcome shortcomings of current 3GPP standards-based handover implementations by enforcing handover rules based on UE identity, which can take into account UE capabilities, enterprise group affiliation, and/or the like. By defining handover thresholds and conditions on a per UE/per UE group basis, handover behaviors can be customized for an enterprise deployment, which may greatly mitigate performance impairments often experienced with current 3GPP standards-based handover logic.

Consider an example scenario under the legacy 3GPP standards-based handover strategy in which all UEs obey the same signal strength threshold that can often result in application failures. For example, consider various UEs, each having a specific traffic profile and moving from a source cell to a target cell in which a first UE (UE 1) is a UE with a strict latency requirement of 20 milliseconds (ms), a second UE (UE 2) is a UE that is to perform high definition (HD) video streaming, and a third UE (UE 3) is a UE that is to download a large firmware file.

In this example all the UEs, would have the same handover thresholds, such that an A2 handover threshold is set to −90 dBm and a first A5 handover threshold (T1) is set to −95 dBm and a second A5 threshold (T2) is set to −110 dBm. In this example scenario, consider that UE 1, UE 2 and UE 3 simultaneously move from a source cell (RAN node A) to a target cell (RAN node B). For this example scenario, the source cell sends the handover threshold information (e.g., A2=−90 dBm, A5 [T1=−95 dBM and T2=−110 dBm]) in the form of an RRC Reconfiguration message to all three UEs.

Generally, the 'A2' threshold represents a reporting event threshold that can be used to trigger measurement reporting by a UE for a handover scenario in which the serving cell for the UE becomes worse than a particular threshold (e.g., when signal strength of the cell service a UE is less than −90 dBm, in this example). Generally, the 'A5' threshold represents a reporting event threshold that can be used to trigger measurement reporting by a UE for a handover scenario in which the primary cell serving the UE becomes worse than a first threshold (T1) and a neighbor cell becomes better than a second threshold (T2). Other thresholds can be configured per 3GPP standards as prescribed, for example, by 3GPP Technical Specification (TS) 38.331. For example, the 'A3' threshold represents a reporting event threshold that can be used to trigger measurement reporting by a UE for a handover scenario in which a neighbor cell has a signal strength offset that is better than the primary cell serving the UE.

In current 3GPP standards-based implementations, threshold information is common for all the UEs, such that even various types of UEs and UEs with different traffic types follow the same threshold for handover to the target cell.

However, because UE 1 in this handover scenario has a strict latency requirement and because a common handover threshold is set to be the same for all the UEs, the UE 1 latency requirement is impacted especially at the cell edge region. Thus, UE 2 and UE 3 can complete the handover without any interruption for their respective applications while the UE 1 application is impacted during its handover procedure, as shown in TABLE 1, below, which illustrates various example behaviors for different Reference Signal Received Power (RSRP) for signals transmitted by each RAN node and received by each UE according to current standards-based usage involving a common handover threshold being set for all of UEs 1-3.

TABLE 1

| | | | | Example Application Behavior for UE 1-3 Following Current Standards | | |
|---|---|---|---|---|---|
| UE | Use case (Metrics) | RSRP −80 dBm RAN Node A | RSRP −95 dBm RAN Node A | RSRP −110 dBm (Handover Threshold for all the UEs) RAN Node A | RSRP −95 dBm (Post-Handover) RAN Node B |
| UE 1 | Round trip latency | 15 ms | 18 ms | 28 ms (Application fails at this latency) | 18 ms |
| UE 2 | Packet loss/ Video streaming throughput | No packet loss 25 Mbps | No packet loss 25 Mbps | No packet loss 25 Mbps | No packet loss 25 Mbps |
| UE 3 | Application download throughput | 500 Mbps | 300 Mbps | 100 Mbps | 500 Mbps |

As illustrated in TABLE 1, the performance of UE 1 is severely impacted between −95 dBm and −110 dBm as the UE 1 application fails at an RSRP of −110 dBm for RAN node A, due to the incurred latency of 28 ms but handover for the UE is not triggered in this range. Based on this analysis, it can be concluded that a common handover template may not work well for all the UE's attached to the cell. Rather, a more refined handover strategy based on device type for selecting handover trigger thresholds would be advantageous over current 3GPP standards-based implementations.

In contrast to the previous 3GPP standards-based example, embodiments herein provide that management system 102 can be configured with different handover profiles in which each handover profile can be configured such that it is suited for a specific type of device and the application(s) operating on the type of a device, including QoS levels that may be involved for various application(s) operating on the different types of devices. For example, a first handover profile can be configured for a first device type, such as AGV's, a second handover profile can be configured for Push2Talk devices, a third handover profile can be configured for robotic arm type devices, and so on.

Each of the handover profiles configured for management system 102 can be identified by a profile identifier, such as a profile name, number, etc., can include a unique set of handover trigger thresholds, and can include UE identifying information that can be used to identify UEs belonging to a particular handover profile. TABLE 2, below, illustrates example details that may be associated with various handover profiles that can be configured for management server 102. Handover trigger thresholds can be expressed in terms of RSRP and/or Reference Signal Received Quality (RSRQ).

TABLE 2

Example Management Server Handover Profile Configuration

| UE Type | Profile Identifier | Handover Thresholds |
| --- | --- | --- |
| UE Type 1 (IoT) | Profile A | A2 = −85 dBm, A5 [T1 = −90 dBm, T2 = −100 dBm] |
| UE Type 2 (Factory Automation) | Profile B | A2 = −90 dBm, A5 [T1 = −100 dBm, T2 = −110 dBm] |
| UE Type 3 (Inventory Management) | Profile C | A2 = −90 dBm, A5 [T1 −100 dBm, T2 = −110 dBm] |

As illustrated in TABLE 2, the management server 102 can include different handover profiles for different UE types in which each profile includes a profile identifier (ID) and handover thresholds associated with each handover profile (e.g., A2 and A5 reporting event thresholds). In at least one embodiment, a network administrator can configure the handover profiles for the management server. In at least one embodiment, the handover profiles for the management server can be obtained from a policy database associated with the enterprise entity managing the enterprise mobile network architecture of FIG. 1.

The handover profiles configured for the management server 102 can be provided to RAN nodes 120 and 122 of (v)RAN 108. In one embodiment, the handover profiles configured for the management server 102 can be provided to RAN nodes 120 and 122 during onboarding of the RAN nodes to the mobile packet core network 106.

In addition to the handover profiles configured for the management server 102 and provided to the RAN nodes 120 and 122, handover profiles can also be configured for the authentication server 104 such that each handover profile can be customized for a specific device type and/or application(s) that share a common set of characteristics (e.g., a common set of application characteristics, a common set of operating characteristics, etc.) in at least one embodiment in order to allow the authentication server to identify a handover profile ID for a given UE such that the handover profile ID can be provided to the management server 102 to facilitate other operations described herein. TABLE 3, below, illustrates example details that may be associated with various handover profiles that can be configured for authentication server 104.

TABLE 3

Example Authentication Server Handover Profile Configuration

| UE Type | Profile Identifier (ID) | Identifying Information for UE Type |
| --- | --- | --- |
| UE Type 1 (IoT) | Profile A | IMEI and/or IMSI 1-10 |
| UE Type 2 (Factory Automation) | Profile B | IMEI and/or IMSI 11-20 |
| UE Type 3 (Inventory Management) | Profile C | IMEI and/or IMSI 21-30 |

As illustrated in TABLE 3, a UE profile for each type of UE can be configured for the authentication server 104 in which each profile can include a unique handover profile (ID) and identifying information for each UE belonging to the particular UE type. The handover profile ID can be a unique profile name, profile ID values, and/or any other identifier types such that the profile IDs used for the authentication server 104 can map to the profile IDs to be utilized by the management server 102 to identify a handover profile for a given UE. As illustrated in TABLE 2 and 3, the profile IDs configured for the management server 102 and the authentication server 104 match such that the management server 102 can perform lookups based on a given profile ID obtained during operation.

For example, as illustrated in TABLE 3, identifying information for Type 1 UEs (e.g., IoT UEs) associated with the profile ID, 'Profile A' (as used in the handover profiles configured for the management server 102), can be identified based on any combination of having a particular International Mobile Equipment Identity (IMEI) (e.g., 11-222222-333333-4) and/or an International Mobile Subscriber Identity (IMSI) within a particular range from 1-10 (e.g., xxxxxxxxxxxx001 (for a 15-digit IMSI) through xxxxxxxxxxxx010). Further, identifying information for Type 2 UEs (e.g., high precision sensors for factory automation) associated with the profile ID, 'Profile B' (as used in the handover profiles configured for the management server 102), can be identified based on any combination of having a particular IMEI and/or an IMSI within a particular range from 11-20. Further, identifying for Type 3 UEs (e.g., handheld devices for inventory management) associated with the profile ID, 'Profile C' (as used in the handover profiles configured for the management server 102), can be identified based on having any combination of a particular IMEI and/or an IMSI within a particular range from 21-30.

Further, in some instances, handover threshold values can also be included in the profiles configured for authentication server 104. In various embodiments, identifying information for identifying UE types can include any combination of IMEI, IMSI, Permanent Equipment Identifier (PEI), Subscription Permanent Identifier (SUPI), Subscription Concealed Identifier (SUCI), and/or the like that can be utilized to identify different UE types.

Further, in some embodiments, it is also possible to define a unique handover profile on a per-UE basis, but this may not be practical for instances involving a large number of UEs. As a variation, it is also possible in some embodiments to define handover profiles based on slice identifiers, though this may involve UEs attaching to a single slice.

Further, in some embodiments, handover profiles can be defined and associated with a network identifier, such as a Public Land Mobile Network (PLMN) ID along with a Network Identifier (NID) (e.g., for CBRS deployments), and/or can be associated with cell identifiers, such as any combination of physical cell identifiers (PCIs), Cell Global Identifiers (CGIs), and or the like.

Further, in a 5G as a Service (5GaaS) offering, a unique set of handover profiles can be configured for a given UE type for each of different multiple network identifiers such that a different handover profile can be applied to the UE type on a network basis (e.g., based on the network to which a given UE seeks connection). Thus, in such embodiments, the selection of a handover profile for a given UE can be based on any combination of a network identifier and/or cell identifier to which the UE is attached. This association can be configured at the authentication server 104, within the mobile packet core network 106, or in the (v)RAN in various embodiments.

In one embodiment, management server 102 may pre-configure the authentication server 104 with UE handover profile mapping information that associates different UE types with different identifying information and handover profiles. In one embodiment, authentication server 104 may obtain the UE handover profile mapping information from an enterprise policy database or system.

Thereafter, when a UE attaches to the network and completes access authentication, the authentication server 104 can identify the device type of the UE and send the handover profile identifier (e.g., name, value, etc.) associated with that UE identity to the AMF 114. Optionally, in one embodiment, threshold parameters, if configured for the authentication server 104, can be sent to the mobile packet core network 106/AMF 114 as well.

The AMF 114 can then send the handover profile identifier, and/or the threshold parameters (if configured for the authentication server 104) to the (v)RAN 108/a corresponding RAN node to which the UE is seeking connection in a downlink (DL) Non-Access Stratum (NAS) Transport message.

In one embodiment, the AMF 114 can send an optional Information Element (IE) to the (v)RAN 108/RAN node using a Radio Access Network User Equipment Next Generation Application Protocol Identifier (RAN-UE-NGAP-ID) for the UE session. Thus, the (v)RAN 108/RAN node can obtain the profile identifier information in association with the RAN-UE-NGAP-ID such that the RAN node can maintain a mapping for the RAN-UE-NGAP-ID along with a Cell Radio Network Temporary Identifier (C-RNTI) for the UE along with the profile identifier.

Using the profile identifier, the RAN node can perform a look-up on the handover profile configurations provide by the management server 102 in order to determine the appropriate handover thresholds for the UE and can send the thresholds to the UE. Thereafter, the UE can trigger a handover based on one or more measured RSRP/RSRQ threshold(s) being satisfied for the corresponding handover thresholds provided by the RAN node.

Although the above approach assumes that handover profiles are defined based on UE group type to categorize each handover profile for a corresponding set or group of UEs, it is also possible to achieve similar features on a per-UE basis. For example, as discussed above, it is possible to define a unique profile on a per-UE basis in some embodiments or, as a variation, it is also possible to define handover profiles based on slice identifiers, though this may involve a UE attaching to a single slice. Other variations for network identifiers and/or cell identifiers can also be utilized to identify different handover profiles for different UEs/UE types in some embodiments.

Although examples herein are described with reference to handover profiles being configured for management server 102 and authentication server 104, it is to be understood that handover profiles may be configured for any AAA, AUSF, HSS, UDM, 3GPP policy server such as a 5G PCF and/or a 4G/LTE Policy and Charging Rule Function (PCRF), and/or within any other function within mobile packet core network 106.

For the present example, consider that UE 110.1 is to be associated with the Type 1 UEs, such that UE 110.1 is associated with handover profile identifier Profile A such that UE 110.1 can have a 18 ms Round-Trip Time (RTT) for packet communications when it reaches a handover threshold as prescribed per TABLE 2. Further, for the present example, consider that UE 110.2 can have a 25 megabits per second (Mbps) streaming experience when it reaches a handover threshold as prescribed per TABLE 2. Finally, consider that UE 110.3 can have a 100 Mbps download speed when it reaches a handover threshold as prescribed per TABLE 2.

TABLE 4, below, illustrates various example behaviors of applications for each UE 110.1, 110.2, and 110.3 that can be realized for various handover scenarios between RAN node 120 and RAN node 122 for different RSRPs utilizing the unique handover thresholds that can be provided to each UE 110.1, 110.2, and 110.3 in accordance with the techniques discussed herein.

TABLE 4

Example Application Behavior Utilizing Unique Handover Thresholds

| UE | Use case (Metrics) | RSRP −80 dBm RAN Node 120 | RSRP −95 dBm RAN Node 120 | RSRP −100 dBm (Handover Threshold for UE 110.1) RAN Node 120 | RSRP −110 dBm (Handover Threshold for UE 110.2 and 110.3) RAN Node 120 | RSRP −95 dBm (Post-Handover) RAN Node 122 |
|---|---|---|---|---|---|---|
| 110.1 | RTT | 15 ms | 18 ms | 20 ms (No interruption for the application) | | 18 ms |
| 110.2 | Packet loss/Video streaming throughput | No packet loss 25 Mbps | No packet loss 25 Mbps | | No packet loss 25 Mbps | No packet loss 25 Mbps |
| 110.3 | Application download throughput | 500 Mbps | 300 Mbps | | 100 Mbps | 500 Mbps |

Accordingly, in contrast to the 3GPP standards-based approach, embodiments herein provide that a given UE can receive individual handover thresholds based on the identity of the UE or the UE's group type.

Figure 2:
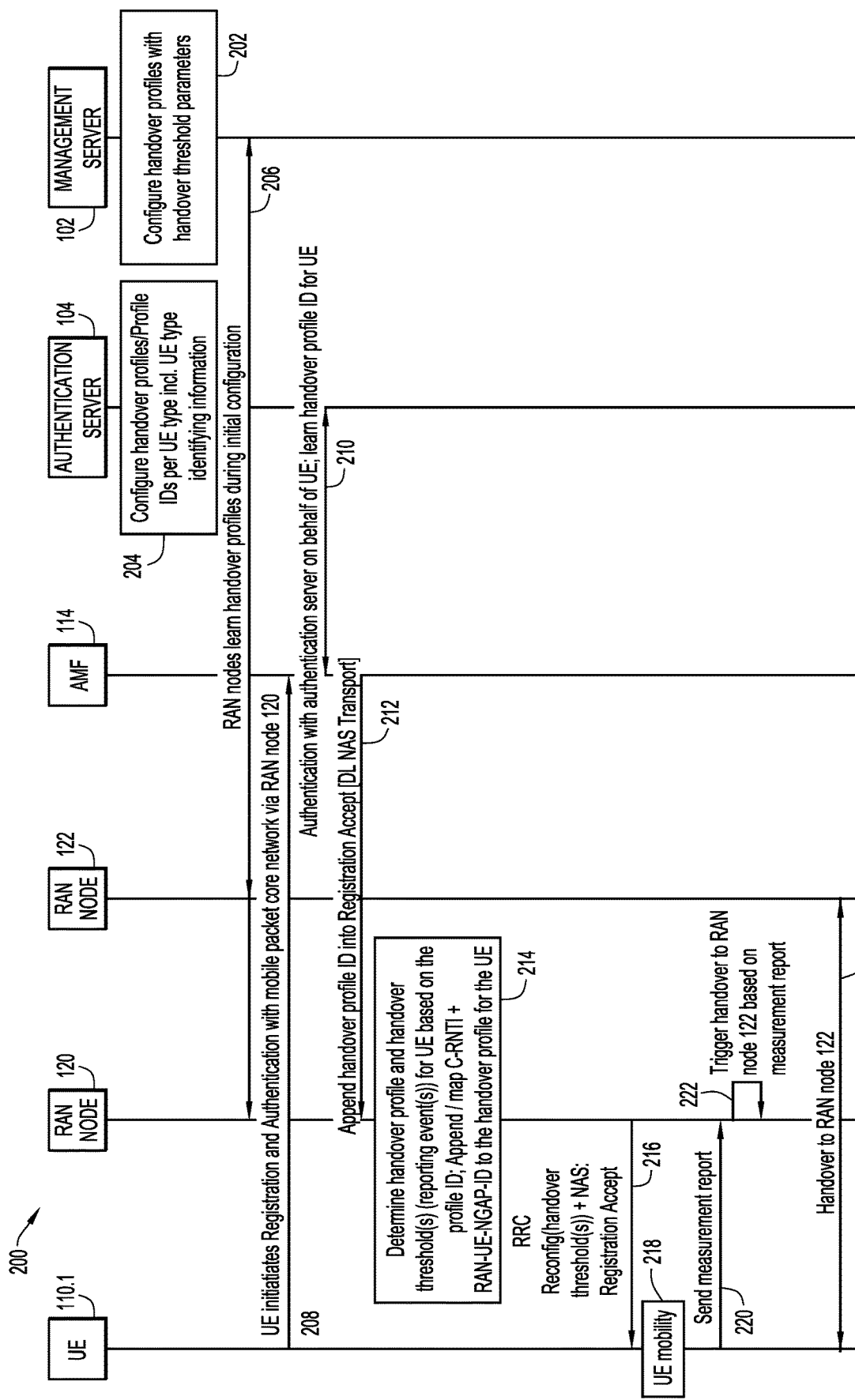
FIG. 2 is a message sequence diagram illustrating a call flow associated with enforcing unique handover trigger thresholds for user equipment (UE), according to an example embodiment.

Additional operations details are discussed with reference to FIG. 2, discussed below, in which FIG. 2 is a message sequence diagram illustrating a call flow 200 associated with enforcing unique handover trigger thresholds for user equipment (UE), according to an example embodiment. FIG. 2 includes UE 110.1, RAN node 120, RAN node 122, AMF 114, authentication server 104 and management server 102.

For the embodiment of FIG. 2, consider at 202 that handover profiles including handover threshold parameters are configured for management server 102. For example, in at least one embodiment, the handover profiles can be configured with a profile ID for each profile and handover threshold parameters where individual UE handover profiles are mapped to certain handover (RSRP/RSRQ) threshold(s) per UE including thresholds at which reporting event(s) may be triggered for UE measurement reporting for different handover scenarios (e.g., A2 threshold, A3 threshold, A5 T1 and T2, etc., as shown in TABLE 2 in one example).

For example, for the embodiment of FIG. 2, consider that: the handover profile for a first type of UEs (e.g., IoT UEs) correspond to a profile ID, 'Profile A', that indicates handover thresholds A2=−85 dBm and A5 [T1=−90 dBM, T2=−100 dBm]; the handover profile for a second type of UEs (e.g., factory automation UEs) corresponds to a profile ID, 'Profile B', that indicates handover thresholds A2=−90 dBm and A5 [T1=−100 dBm, T2=−110 dBm]; and the handover profile for a third type of UEs (e.g., inventory management UEs) corresponds to a profile ID, 'Profile C', that indicates handover thresholds A2=−90 dBm and A5 [T1=−100 dBm, T2=−110 dBm].

At 204, the authentication server 104 can be configured with handover profiles that include profile IDs per UE type along with UE type identifying information (e.g., IMEI and/or IMSI range, PEI, etc.) for different UE types (e.g., as shown in TABLE 3).

For example, for the embodiment of FIG. 2, consider that: the handover profile for the first type of UEs (e.g., IoT UEs) corresponding to the profile ID, 'Profile A' (as used in the handover profiles configured for the management server 102), identify UEs having a particular combination of IMEI(s) and/or IMSI(s) (e.g., 11-222222-333333-4) and/or an International Mobile Subscriber Identity (IMSI) within a particular range from 1-10 (e.g., xxxxxxxxxxxx001 (for a 15-digit IMSI) through xxxxxxxxxxxx010); the handover profile for the second type of UEs (e.g., high precision sensors for factory automation) corresponding to the profile ID, 'Profile B' (as used in the handover profiles configured for the management server 102), can be identified based on any combination of having a particular IMEI and/or an IMSI within a particular range from 11-20; and the handover profile for the third type of UEs (e.g., handheld devices for inventory management) corresponding to the profile ID, 'Profile C' (as used in the handover profiles configured for the management server 102), can be identified based on having any combination of a particular IMEI and/or an IMSI within a particular range from 21-30.

For the embodiment of FIG. 2, consider that UE 110.1 has an IMEI and/or IMSI that corresponds to the first type of UEs (e.g., Profile A).

At 206, the RAN nodes 120 and 122 learn handover profiles from the management server 102 during the initial configuration/onboarding of each RAN node 120 and 122. In various embodiments, the handover profiles can be provided from the management node 102 to each RAN node 120, 122 using any combination of push (e.g., management node 102 pushes profiles to each RAN node) and/or pull (e.g., each RAN node queries the management node 102 for the profiles and the management node responds with profile information) models.

For the embodiment of FIG. 2, consider that UE 110.1 seeks attachment to RAN node 120 and initiates registration and authentication with the mobile packet core network 106/AMF 114 via RAN node 120, as shown at 208. At 210, the AMF 114 performs an authentication with the authentication server 104 on behalf of the UE 110 and learns the profile ID for the UE. In at least one embodiment, the authentication at 210 can include the AMF 114 providing the IMEI and/or IMSI of UE 110.1 with the authentication server 104, which triggers the authentication server 104 to perform a lookup on its handover profile configuration (assuming successful authentication of the UE) and identify/provide the profile ID to which the UE 110.1 corresponds (e.g., Profile A, for this example using any combination of the IMEI and/or IMSI for UE 110.1). Thus, the authentication server 104 can send handover profile information to a 5GC whenever the 5GC receives a registration request from a UE.

At 212, assuming successful authentication of UE 110.1, the AMF 114 communicates a Registration Accept to the RAN node 120 via a DL NAS Transport message including the RAN-UE-NGAP-ID for the UE 110.1 session in which the handover profile ID (e.g., Profile A) is appended to the DL NAS Transport message via an IE containing the profile ID. Thus, the 5GC sends an optional IE with handover profile ID to the (v)RAN 108.

Now (v)RAN 108, such as RAN node 120, has the handover profile ID information along with the RAN-UE-NGAP-ID for UE 110.1. At 214, the RAN node 120 determines the handover profile for the UE 110.1 based on the profile ID obtained from the packet core/AMF 114 at 212 using the handover profile information as learned from the management server 102, as discussed above at 202.

Upon determining the handover profile for the UE 110.1 using the profile ID, the RAN node 120 also determines the handover threshold(s) for the UE (e.g., A2=−85 dBm, A5 [T1=−90 dBM, T2=−100 dBm] for Profile A) and appends or otherwise maps the C-RNTI for the UE in association with the RAN-UE-NGAP-ID to the corresponding handover profile for the UE at 214. Typically, C-RNTI is set for a UE following successful RRC setup completion. Although not illustrated in FIG. 2, it is assumed that UE 110.1 performs successful RRC setup with RAN node 120 through which the RAN node 120 assigns a C-RNTI to the UE 110.1 In at least one embodiment, the mapping between C-RNTI, RAN-UE-NGAP-ID, and handover profile for the UE 110.1 aids the RAN node 120 in triggering a handover for the UE 110.1. For example, when UE 110.1 reports a measurement report based on a handover threshold that contains measurement information (e.g., RSRP/RSRQ), the RAN node 120 can perform a lookup on the C-RNTI+RAN-UE-NGAP-ID to determine the threshold(s) for the UE based on the stored mapping in order to verify whether the measurement information satisfies one of the handover threshold(s) for the handover profile to which the C-RNTI+RAN-UE-NGAP-ID for the UE 110.1 is mapped.

At 216, the RAN node 120 sends a RRC Reconfiguration message to the UE 110.1 that includes the handover threshold(s) as identified in the handover profile for UE 110.1 (e.g., A2=−85 dBm, A5 [T1=−90 dBM, T2=−100 dBm]) along with a NAS Registration Accept message.

At 218, consider that UE 110.1 mobility causes the UE to be further (geographically) from RAN node 120 and closer toward RAN node 122. Based on RSRP/RSRQ measurements performed by the UE 110.1 with reference to RAN node 122, consider that the measured RSRP/RSRQ satisfies at least one of the handover threshold(s) set for UE 110.1 such that satisfying at least one of the threshold(s) triggers UE 110.1 to send a measurement report to RAN node 120, as shown at 220. Upon obtaining the measurement report and comparison to the measured RSRP/RSRQ the handover threshold(s) maintained in the UE 110.1 C-RNTI+RAN-UE-NGAP-ID mapping maintained at RAN node 120, the RAN node 120 triggers a handover to RAN node 122, as shown at 222. At 224, the UE 110.1 performs a handover to RAN node 122. Thus, as illustrate in the FIG. 2, system 100 can provide for the ability to enforce unique handover trigger thresholds for UEs in accordance with embodiments herein.

Figure 3:
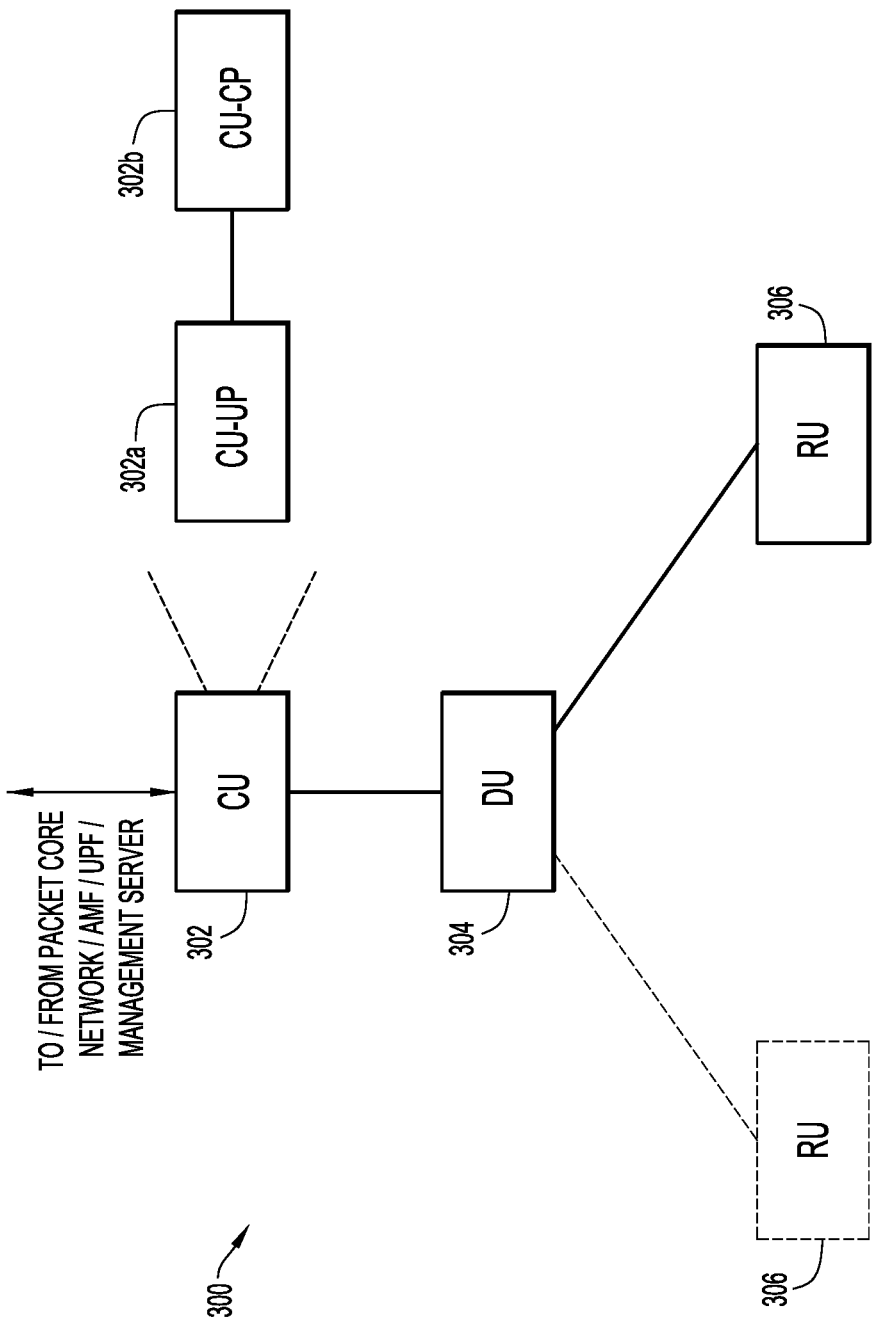
FIG. 3 is a simplified block diagram illustrating example details associated with a virtualized radio access network architecture that may be utilized to facilitate operations for enforcing unique handover trigger thresholds for UE based on UE identity, according to an example embodiment.

Referring to FIG. 3, FIG. 3 is a simplified block diagram illustrating example details associated with a virtualized radio access network (vRAN) architecture that may be utilize to facilitate operations for enforcing unique handover trigger thresholds for UE, according to an example embodiment.

As noted above, a RAN node, such as RAN node 120 and/or RAN node 122 shown in FIG. 1, can be implemented through a disaggregated vRAN architecture, such as the disaggregated vRAN architecture 300 as shown in FIG. 3 including a CU 302, a DU 304 and at least one RU 306. The CU 302 may interface with the DU 304, which may further interface with the RU 306. The CU 302 may further interface with one or more AMFs, UPFs, and/or a management server.

Generally, RU 306 may perform lower PHY layer and RF operations to facilitate RF connections with one or more UE. Generally, DU 304 (also sometimes referred to as a baseband unit) may provide lower level operations of the radio signal processing stack, such as RLC, MAC, and higher PHY layer operations, such as digital processing, including signal modulation, encoding, and scheduling, among others. In some instances, a DU, such as DU 304, can provide such functionality for multiple RUs 306.

In some instances, the CU 302 can be further disaggregated into a CU-UP component 302a and a CU-CP component 302b. Generally, CU-UP 302a may provide upper level operations of a radio signal processing stack, such as user PDCP functions and user plane SDAP functions, among others. The split of operations of a radio signal processing stack among between DU 304 and a CU-UP 302a can be varied depending on implementation and/or configuration of a given vRAN architecture. CU-CP 302b generally operates to control DU(s) and the CU-UP for a vRAN architecture via RRC functions and the control plane part of the PDCP protocol.

For embodiments in which a vRAN architecture is implemented for a system as shown in FIG. 1, handover profiles and corresponding UE-to-profile mappings may be stored/maintained in any combination of a CU, DU, and/or RU.

Figure 4:
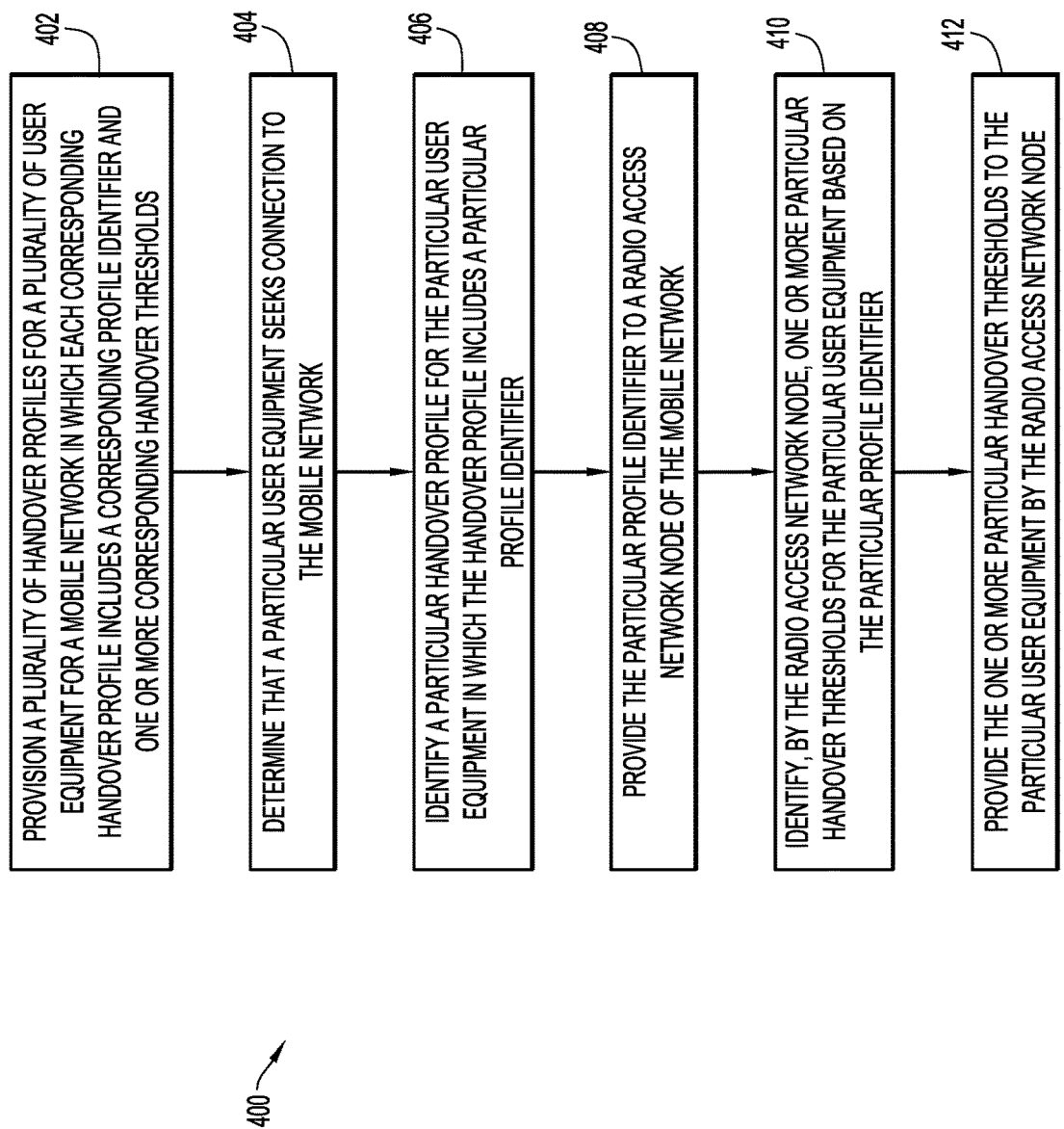
FIG. 4 is a flow chart depicting a method according to an example embodiment.

Referring to FIG. 4, FIG. 4 is a flow chart depicting a method 400 according to an example embodiment. In at least one embodiment, method 400 illustrates example operations that may be performed, at least in part, by an authentication server, such as authentication server 104, and a RAN node of a (v)RAN architecture, such as RAN node 120, in order to enforce unique handover trigger thresholds for UE, according to an example embodiment.

Consider, at 402, that the method may include provisioning a plurality of handover profiles for a plurality of user equipment for a mobile network in which each corresponding handover profile includes, at least in part, a corresponding profile identifier and one or more corresponding handover thresholds.

In one instance, provisioning the plurality of handover profiles for the plurality of user equipment can include assigning, at an authentication server of the mobile network (e.g., authentication server 104), each of the plurality of user equipment to each of a corresponding handover profile based a device type of each of the plurality of user equipment, wherein multiple user equipment of a same device type can be assigned to a same handover profile (e.g., multiple user equipment being of Type 1 can be assigned to Profile A, etc.). In one instance, the assigning includes identifying each of the plurality of user equipment as being associated with each of a particular device type based on an IMEI and an IMSI for each of the plurality of user equipment (e.g., a particular IMEI and the IMSI of each user equipment being within a particular range corresponding to each handover profile).

In one instance, provisioning the plurality of handover profiles for the plurality of user equipment for the mobile network can further including provisioning the plurality of handover profiles at a management server for the mobile network (e.g., management server 102) and communicating the plurality of handover profiles from the management server to the radio access network node (e.g., to RAN nodes 120 and 122). The handover profiles provisioned at the management server and the radio access network node can include, at least in part, the handover profile identifiers for each handover profile and the one or more corresponding handover thresholds (e.g., A2 threshold, A3 threshold, A5 threshold, etc.) for each handover profile.

At 404, the method includes determining that a particular user equipment seeks connection to the mobile network. For example, the authentication server can determine that the particular user equipment seeks connection to the mobile network based on an authentication performed on behalf of the user equipment by a packet core network/AMF (e.g., AMF 114) with the authentication server.

At 406, the method includes identifying a particular handover profile for the particular user equipment in which the particular handover profile includes a particular profile identifier. For example, the authentication server can identify the particular handover profile for the particular user equipment using the IMEI and IMSI of the user equipment. Other user equipment identifiers (e.g., PEI, SUPI, etc.) may be utilized to identify a particular handover profile for a particular user equipment, depending on how the profiles are organized/stored by the authentication server. In various embodiments, the profile identifier can be any combination of a handover profile name, value, and/or the like.

At 408, the method includes providing the particular profile identifier to a radio access network node (e.g., a gNodeB, any combination of RU, DU and CU, etc.) of the mobile network. For example, the packet core/AMF can determine the particular profile identifier from the authentication server during the authentication of the particular user equipment with the authentication server and the packet core/AMF can provide the particular profile identifier to the radio access network node of the mobile network with which the particular user equipment seeks connection/attachment. In one instance, the particular profile identifier for the particular user equipment can be appended to a Registration Accept for the particular user equipment by including the particular profile identifier within an optional IE that can be included with a DL NAS transport message communicated to the radio access network node.

At 410, the method may include identifying, by the radio access network node, one or more particular handover thresholds for the particular user equipment based on the particular profile identifier. For example, the radio access network node can perform a lookup on handover profiles obtained or otherwise learned from the management server using the particular profile identifier obtained from the packet core/AMF in order to determine the one or more particular handover thresholds (e.g., A2 threshold, A3 threshold, A5 threshold, etc.) for the particular user equipment. The handover thresholds may represent threshold(s) that may be triggered for user equipment measurement reporting for different handover scenarios.

Although not illustrated in FIG. 4, the method may include maintaining, by the radio access network node of the mobile network, a mapping between the particular profile identifier and at least one identifier for the particular user equipment. In one example, the mapping includes the particular profile identifier for the particular handover profile, a RAN-UE-NGAP-ID for the particular user equipment, and a C-RNTI for the particular user equipment that is stored in association with the particular handover profile for the particular user equipment.

At 412, the method may include providing the one or more particular handover thresholds to the particular user equipment by the radio access network node. In various embodiments, the radio access network node can include a gNodeB, an eNodeB, and/or any combination of a CU component, a DU component, and a RU component. Thus, techniques herein can be provided for any combination of 4G, 5G, and/or nG radio access networks.

Figure 5:
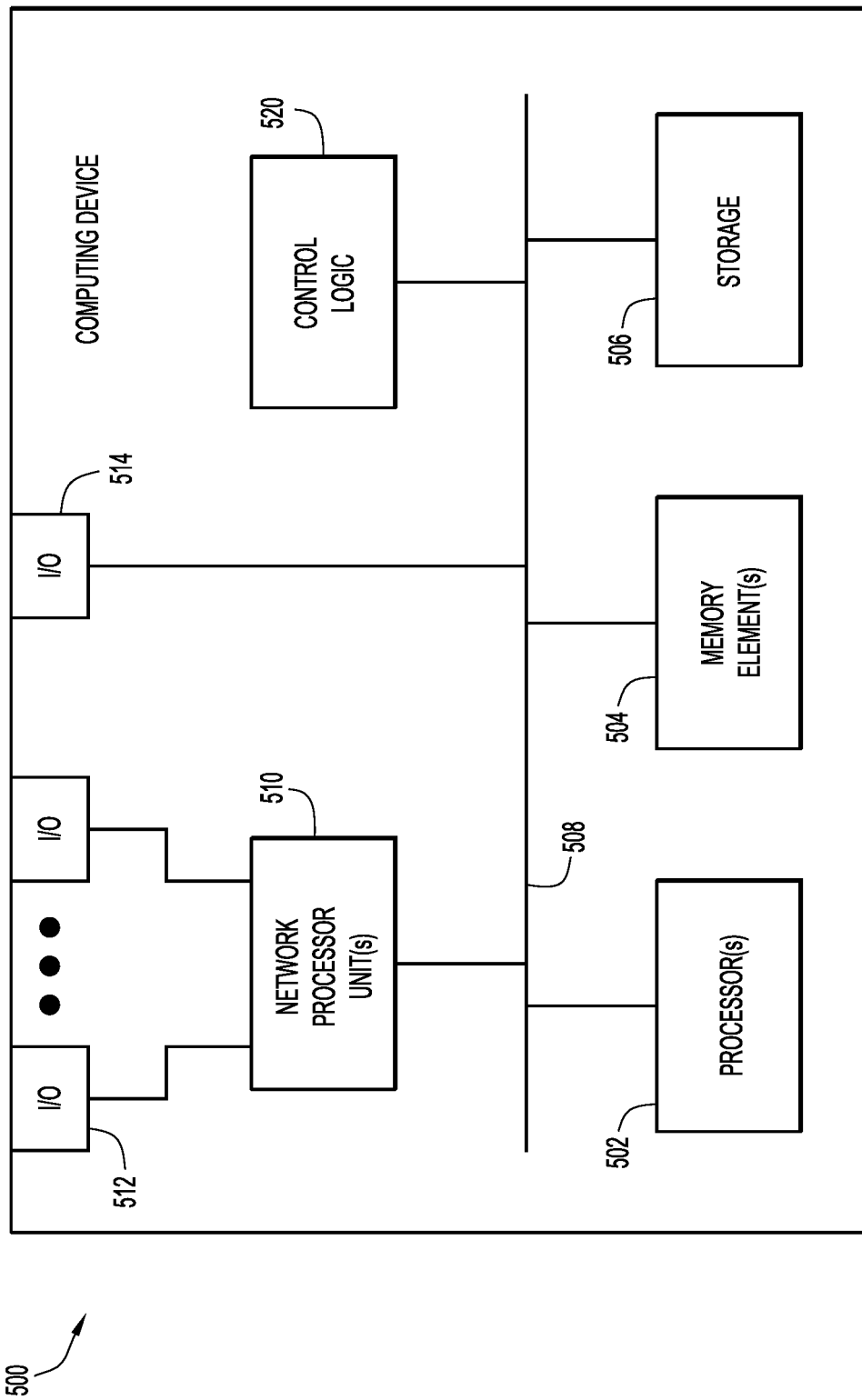
FIG. 5 is a hardware block diagram of a computing device that may perform functions associated with any combination of operations, in connection with the techniques presented herein.

Referring to FIG. 5, FIG. 5 illustrates a hardware block diagram of a computing device 500 that may perform functions associated with operations discussed herein. In various embodiments, a computing device, such as computing device 500 or any combination of computing devices 500, may be configured as any entity/entities as depicted herein in order to perform operations of the various techniques discussed herein, such as operations that may be performed by any of an authentication server (e.g., authentication server 104), a management server (e.g., management server 102), an AMF (e.g., AMF 114), and/or any other mobile packet core network element. For embodiments in which a RAN architecture may be implemented as a disaggregated vRAN architecture, computing device 500 may be representative of any combination of a CU (e.g., CU 302, CU-UP 302*a*, and/or CU-CP 302*b*) and a DU (e.g., DU 304).

In at least one embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device. Processor(s) 502 (e.g., hardware processor(s)) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. In another example, handover profiles configured for the computing device 500 can be stored for computing device 500 using any combination of memory element(s) 504 and/or storage 506. In yet another example, if the computing device 500 is implemented as a CU or DU that is provisioned with handover profiles, the computing device 500 can maintain mapping information including UE handover profile to C-RNTI+RAN-UE-NGAP-ID mapping information for one or more UEs using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations as discussed herein, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Figure 6:
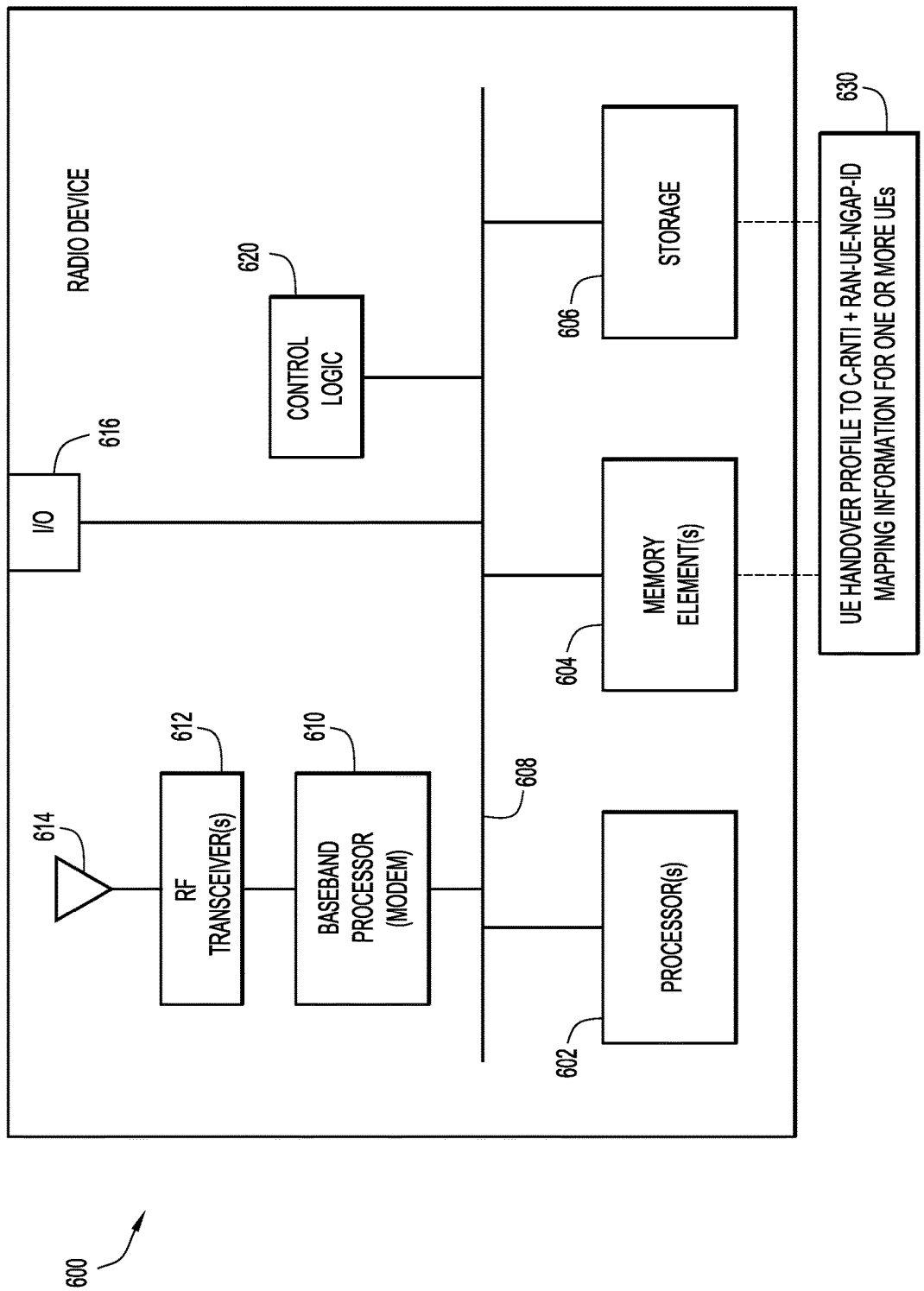
FIG. 6 is a hardware block diagram of a radio access network node that may perform functions associated with any combination of operations, in connection with the techniques presented herein.

Referring to FIG. 6, FIG. 6 illustrates a hardware block diagram of a radio device 600 that may perform functions associated with operations discussed herein. In various embodiments, a radio device, such as radio device 600 or any combination of radio devices 600, may be configured as any radio node/nodes as depicted herein in order to perform operations of the various techniques discussed herein, such as operations that may be performed by any of a RAN node (e.g., RAN node 120, 122) and/or an RU (e.g., RU 306).

In at least one embodiment, radio device 600 may include one or more processor(s) 602, one or more memory element(s) 604, storage 606, a bus 608, a baseband processor or modem 610, one or more radio RF transceiver(s) 612, one or more antennas or antenna arrays 614, one or more I/O interface(s) 616, and control logic 620. In various embodiments, instructions associated with logic for radio device 600 can overlap in any manner and are not limited to the specific allocation of instructions and/or operations described herein.

The one or more processor(s) 602, one or more memory element(s) 604, storage 606, bus 608, and I/O 616 may be configured/implemented in any manner described herein, such as described above at least with reference to FIG. 5. In one example, if the radio device 600 is provisioned with handover profiles, the radio device 600 can maintain mapping information 630 including UE handover profile to C-RNTI+RAN-UE-NGAP-ID mapping information for one or more UEs using any combination of memory element(s) 604 and/or storage 606.

The RF transceiver(s) 612 perform RF transmission and RF reception of wireless signals via antenna(s)/antenna array(s) 614, and the baseband processor (modem) 610 performs baseband modulation and demodulation, etc. associated with such signals to enable wireless communications for radio device 600.

In various embodiments, control logic 620, can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Although not illustrated, it is to be understood that UEs, such as UEs 110.1, 110.2, and 110.3 can also be configured with a baseband processor or modem, one or more radio RF transceiver(s), one or more antennas or antenna arrays, processor(s), memory element(s), storage, control logic, etc. to facilitate storing one or more handover/reporting event thresholds for one operations described herein.

The programs described herein (e.g., control logic 520/620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504/604 and/or storage 506/606 can store data, software, code, instructions (e.g., processor instructions), logic, parameters, combinations thereof, and/or the like used for operations described herein. This includes memory element(s) 504/604 and/or storage 506/606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include provisioning a plurality of handover profiles for a plurality of user equipment for a mobile network, wherein each corresponding handover profile includes a corresponding profile identifier and one or more corresponding handover thresholds; determining that a particular user equipment seeks a connection to the mobile network; identifying a particular handover profile for the particular user equipment, wherein the particular handover profile includes a particular profile identifier; providing the particular profile identifier to a radio access network node of the mobile network; identifying, by the radio access network node, one or more particular handover thresholds for the particular user equipment based on the particular profile identifier; and providing one or more particular handover thresholds to the particular user equipment.

In one instance, provisioning the plurality of handover profiles for the plurality of user equipment for the mobile network further incudes assigning, at an authentication server of the mobile network, each of the plurality of user equipment to each of a corresponding handover profile based a device type of each of the plurality of user equipment, wherein multiple user equipment of a same device type can be assigned to a same handover profile. In one instance, the assigning includes identifying each of the plurality of user equipment as being associated with each of a particular device type based on at least one of an International Mobile Equipment Identity (IMEI) and an International Mobile Subscriber Identity (IMSI) for each of the plurality of user equipment.

In one instance, provisioning the plurality of handover profiles for the plurality of user equipment for the mobile network further includes provisioning the plurality of handover profiles at a management server for the mobile network; and communicating the plurality of handover profiles from the management server to the radio access network node.

In one instance, the method further includes maintaining, by the radio access network node of the mobile network, a mapping between the particular profile identifier and at least one identifier for the particular user equipment. In one instance, the mapping includes the particular profile identifier for the particular handover profile, a Radio Access Network User Equipment Next Generation Application Protocol Identifier (RAN-UE-NGAP-ID) for the particular user equipment, and a Cell Radio Network Temporary Identifier (C-RNTI) for the particular user equipment.

In one instance, the radio access network node is at least one of any combination of a central unit (CU) component, a distributed unit (DU) component, and a radio unit (RU) component; an evolved node B (eNodeB); and a next generation Node B (gNodeB).

In summary, UE agnostic handovers that are currently implemented could have an impact on the user application performance while performing active mode mobility. With the UE based handover strategy as discussed for embodiments herein in which network elements are aware of the UE type and the UE QoS requirements, individual handover threshold profiles can be created for different UE device types and/or applications operating on such UE device types. Thus, the strategy provided by embodiments herein may provide more granularity at a UE level and may advantageously provide improvement in application performance while performing handovers between neighboring cells across an enterprise private mobile network.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm·wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s)

and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
provisioning, at an authentication server of a mobile network, a plurality of handover profiles for a plurality of user equipment for the mobile network, wherein each corresponding handover profile includes a corresponding profile identifier and one or more corresponding handover thresholds;
determining, by the authentication server, that a particular user equipment seeks a connection to the mobile network;
identifying a particular handover profile for the particular user equipment, wherein the particular handover profile includes a particular profile identifier;
providing the particular profile identifier to a radio access network node of the mobile network;
identifying, by the radio access network node, one or more particular handover thresholds for the particular user equipment based on the particular profile identifier; and
providing the one or more particular handover thresholds to the particular user equipment.

2. The method of claim 1, wherein provisioning the plurality of handover profiles for the plurality of user equipment for the mobile network further comprises:
assigning, at the authentication server of the mobile network, each of the plurality of user equipment to each of a corresponding handover profile based on a device type of each of the plurality of user equipment, wherein multiple user equipment of a same device type can be assigned to a same handover profile.

3. The method of claim 2, wherein the assigning includes identifying each of the plurality of user equipment as being associated with each of a particular device type based on at least one of an International Mobile Equipment Identity (IMEI) and an International Mobile Subscriber Identity (IMSI) for each of the plurality of user equipment.

4. The method of claim 1, wherein provisioning the plurality of handover profiles for the plurality of user equipment for the mobile network further comprises:
provisioning the plurality of handover profiles at a management server for the mobile network; and
communicating the plurality of handover profiles from the management server to the radio access network node.

5. The method of claim 1, further comprising:
maintaining, by the radio access network node of the mobile network, a mapping between the particular profile identifier and at least one identifier for the particular user equipment.

6. The method of claim 5, wherein the mapping includes the particular profile identifier for the particular handover profile, a Radio Access Network User Equipment Next Generation Application Protocol Identifier (RAN-UE-NGAP-ID) for the particular user equipment, and a Cell Radio Network Temporary Identifier (C-RNTI) for the particular user equipment.

7. The method of claim 1, wherein the radio access network node is at least one of:
- any combination of a central unit (CU) component, a distributed unit (DU) component, and a radio unit (RU) component;
- an evolved node B (eNodeB); and
- a next generation Node B (gNodeB).

8. A plurality of non-transitory computer readable storage media encoded with instructions that, when executed by a plurality of processors, cause the plurality of processors to perform operations, comprising:
- provisioning, at an authentication server of a mobile network, a plurality of handover profiles for a plurality of user equipment for the mobile network, wherein each corresponding handover profile includes a corresponding profile identifier and one or more corresponding handover thresholds;
- determining, by the authentication server, that a particular user equipment seeks a connection to the mobile network;
- identifying a particular handover profile for the particular user equipment, wherein the particular handover profile includes a particular profile identifier;
- providing the particular profile identifier to a radio access network node of the mobile network;
- identifying, by the radio access network node, one or more particular handover thresholds for the particular user equipment based on the particular profile identifier; and
- providing the one or more particular handover thresholds to the particular user equipment.

9. The media of claim 8, wherein provisioning the plurality of handover profiles for the plurality of user equipment for the mobile network further comprises:
- assigning, at the authentication server of the mobile network, each of the plurality of user equipment to each of a corresponding handover profile based a device type of each of the plurality of user equipment, wherein multiple user equipment of a same device type can be assigned to a same handover profile.

10. The media of claim 9, wherein the assigning includes identifying each of the plurality of user equipment as being associated with each of a particular device type based on at least one of an International Mobile Equipment Identity (IMEI) and an International Mobile Subscriber Identity (IMSI) for each of the plurality of user equipment.

11. The media of claim 8, wherein provisioning the plurality of handover profiles for the plurality of user equipment for the mobile network further comprises:
- provisioning the plurality of handover profiles at a management server for the mobile network; and
- communicating the plurality of handover profiles from the management server to the radio access network node.

12. The media of claim 8, further encoded with instructions that, when executed by a plurality of processors, cause the plurality of processors to perform operations, comprising:
- maintaining, by the radio access network node of the mobile network, a mapping between the particular profile identifier and at least one identifier for the particular user equipment.

13. The media of claim 12, wherein the mapping includes the particular profile identifier for the particular handover profile, a Radio Access Network User Equipment Next Generation Application Protocol Identifier (RAN-UE-NGAP-ID) for the particular user equipment, and a Cell Radio Network Temporary Identifier (C-RNTI) for the particular user equipment.

14. A system comprising:
- at least one memory element for storing data; and
- at least one processor for executing instructions associated with the data, wherein executing the instructions causes the system to perform operations, comprising:
  - provisioning, at an authentication server of a mobile network, a plurality of handover profiles for a plurality of user equipment for the mobile network, wherein each corresponding handover profile includes a corresponding profile identifier and one or more corresponding handover thresholds;
  - determining, by the authentication server, that a particular user equipment seeks a connection to the mobile network;
  - identifying a particular handover profile for the particular user equipment, wherein the particular handover profile includes a particular profile identifier;
  - providing the particular profile identifier to a radio access network node of the mobile network;
  - identifying, by the radio access network node, one or more particular handover thresholds for the particular user equipment based on the particular profile identifier; and
  - providing the one or more particular handover thresholds to the particular user equipment.

15. The system of claim 14, wherein provisioning the plurality of handover profiles for the plurality of user equipment for the mobile network further comprises:
- assigning, at the authentication server of the mobile network, each of the plurality of user equipment to each of a corresponding handover profile based a device type of each of the plurality of user equipment, wherein multiple user equipment of a same device type can be assigned to a same handover profile.

16. The system of claim 15, wherein the assigning includes identifying each of the plurality of user equipment as being associated with each of a particular device type based on at least one of an International Mobile Equipment Identity (IMEI) and an International Mobile Subscriber Identity (IMSI) for each of the plurality of user equipment.

17. The system of claim 14, wherein provisioning the plurality of handover profiles for the plurality of user equipment for the mobile network further comprises:
- provisioning the plurality of handover profiles at a management server for the mobile network; and
- communicating the plurality of handover profiles from the management server to the radio access network node.

18. The system of claim 14, wherein executing the instructions causes the system to perform further operations, comprising:
- maintaining, by the radio access network node of the mobile network, a mapping between the particular profile identifier and at least one identifier for the particular user equipment.

19. The system of claim 18, wherein the mapping includes the particular profile identifier for the particular handover profile, a Radio Access Network User Equipment Next Generation Application Protocol Identifier (RAN-UE-NGAP-ID) for the particular user equipment, and a Cell Radio Network Temporary Identifier (C-RNTI) for the particular user equipment.

20. The system of claim 14, wherein the radio access network node is at least one of:

any combination of a central unit (CU) component, a distributed unit (DU) component, and a radio unit (RU) component;
an evolved node B (eNodeB); and
a next generation Node B (gNodeB).

* * * * *